J. D. LEONARD.
Self-Acting Coal-Car Brakes.
No. 142,572.                          Patented September 9, 1873.
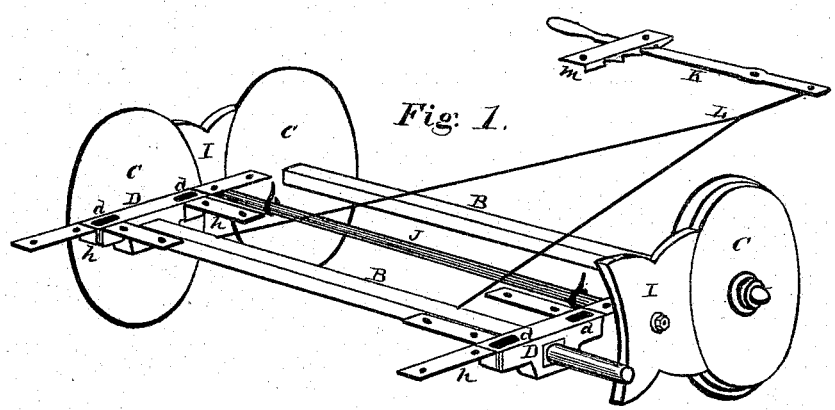
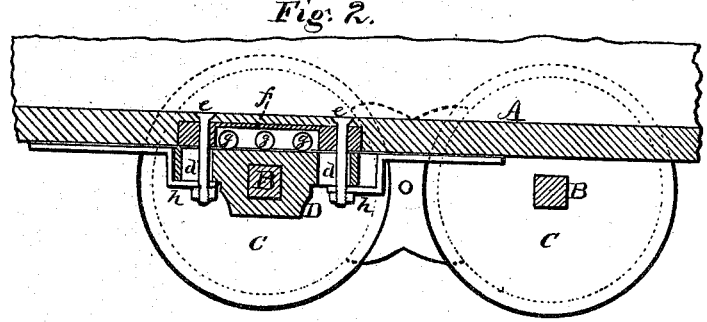
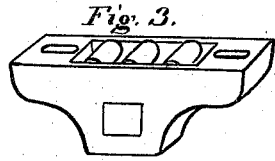
Witnesses,                     Inventor,

UNITED STATES PATENT OFFICE.

JOHN D. LEONARD, OF CLEVELAND, OHIO, ASSIGNOR OF ONE-HALF HIS RIGHT TO RICHARD E. HOYT, OF SAME PLACE.

IMPROVEMENT IN SELF-ACTING COAL-CAR BRAKES.

Specification forming part of Letters Patent No. 142,572, dated September 9, 1873; application filed June 28, 1873.

*To all whom it may concern:*

Be it known that I, JOHN D. LEONARD, of Cleveland, Ohio, have invented a new Self-Acting Coal-Car Brake, of which the following is a specification:

This invention has for its object to quickly set the brakes on coal-cars, while descending a grade, by the weight and gravity of the car; and is accomplished by arranging one of the axles in the truck so as to slide by the weight and gravity of the car toward the other axle, whereby the brake-block is made to bind between the wheels and set them.

The construction and operation of my invention are as follows:

Referring to the accompanying drawing, Figure 1 is a perspective view of the truck. Fig. 2 is a longitudinal section of the car body and truck, showing the construction and arrangement of the sliding axle with the car-body. Fig. 3 is a detached view of the sliding pillar-block, showing it as having the friction-rollers placed in it.

A, Fig. 2, is the bottom or sill of a car. B B are square axles, and C C are car-wheels, which turn independently on the axles. One of said axles is secured permanently to the car, but the other I set in the pillar-blocks D D. The said pillar-blocks are permanently secured to the axle B, and have slots $d\ d$ in each end, through which bolts $e\ e$ pass, and which allows them to slide the length of said slots on said bolts. Bedded in the sill of the car and over the pillar-blocks are boxes $f$, having friction-rollers $g\ g$ in them, against which the pillar-blocks ride, the said bolts $e\ e$ also holding the boxes in place, and also passing through the brackets $h\ h$, which are also bolted to the car-body. Between the wheels are brake-blocks I I, attached to a bar, J, which is suspended from the car-body independently of the truck. Attached to the car-body is a lever, K, to the short arm of which is attached a push-bar, L, connecting it with the sliding axle B, the long arm of the lever reaching out to one side of the car, and has a handle on the end, and also engages with a ratchet, $m$, attached to the under side of the car.

The operation of this brake is as follows: When the car is descending, the sliding axle being the advance one, and it is desired to stop the car, the lever is released from the ratchet, giving freedom to the axle to slide; when the weight of the car forces the said axle backward and binds the brake-blocks between the wheels, and effectually stops the car. The lever K and push-bar L are only employed to hold the axles apart. To release the brake the lever is again pushed forward, separating the wheels, and, being caught in the ratchet, holds it there. The friction-rollers may be arranged in the pillar-block, instead of in a box in the car, if desired; but that shown in Fig. 2 is more desirable, as it is not liable to get filled with dirt.

I claim—

The combination and arrangement of the pillar-block D, having slots $d\ d$, the box $f$, having friction-rollers $g\ g$, the brackets $h\ h$, the lever K, push-bar L, brake-blocks I I, and bar J, ratchet $m$, with the axles B B, wheels C C, and body A of the car, substantially as shown and described, and for the purpose set forth.

J. D. LEONARD.

Witnesses:
GEO. W. TIBBITTS,
R. E. HOYT.